US011904496B2

(12) United States Patent
Kalwa

(10) Patent No.: US 11,904,496 B2
(45) **Date of Patent: *Feb. 20, 2024**

(54) PROCESS FOR THE PRODUCTION OF OSB WOOD-BASED BOARDS WITH REDUCED EMISSION OF VOLATILE ORGANIC COMPOUNDS (VOCS)

(71) Applicant: SWISS KRONO Tec AG, Lucerne (CH)

(72) Inventor: Norbert Kalwa, Horn-Bad Meinberg (DE)

(73) Assignee: SWISS KRONO Tec AG, Lucerne (CH)

( * ) Notice: Subject to any disclaimer, the term of this patent is extended or adjusted under 35 U.S.C. 154(b) by 253 days.

This patent is subject to a terminal disclaimer.

(21) Appl. No.: 17/231,311

(22) Filed: Apr. 15, 2021

(65) Prior Publication Data

US 2021/0245391 A1 Aug. 12, 2021

Related U.S. Application Data

(63) Continuation of application No. 16/497,535, filed as application No. PCT/EP2018/056070 on Mar. 12, 2018, now Pat. No. 11,007,668.

(30) Foreign Application Priority Data

Apr. 25, 2017 (EP) .................................. 17 167 974

(51) Int. Cl.
*B27N 1/00* (2006.01)
*B27N 3/14* (2006.01)
(Continued)

(52) U.S. Cl.
CPC *B27K 1/02* (2013.01); *B27L 1/00* (2013.01); *B27L 11/007* (2013.01); *B27N 1/00* (2013.01);
(Continued)

(58) Field of Classification Search
CPC .......... B27K 1/02; B27K 5/001; B27K 5/007; B27K 5/0085; B27K 5/04; B27K 2200/10;
(Continued)

(56) References Cited

U.S. PATENT DOCUMENTS

| | | |
|---|---|---|
| 4,610,913 A | 9/1986 | Barnes |
| 5,063,010 A | 11/1991 | Fischer et al. |

(Continued)

FOREIGN PATENT DOCUMENTS

| | | |
|---|---|---|
| CN | 101125436 A | 2/2008 |
| CN | 101437666 A | 5/2009 |

(Continued)

OTHER PUBLICATIONS

"Steam", Wikipedia, 2017, retrieved from https://en.wikipedia.org/w/index.php?title=Steaeoldid=773727907.

*Primary Examiner* — Michael A Tolin
(74) *Attorney, Agent, or Firm* — The Webb Law Firm

(57) ABSTRACT

A process for the production of OSB wood-based panels including: a) producing wood strands from suitable wood logs; b) treating at least part of the wood strands with steam at a temperature between 80° C. and 120° C. and a pressure between 0.5 bar and 2 bar; c) drying the steam-treated wood strands; d) gluing the steam-treated and dried wood strands and, optionally, gluing the non-steam treated wood strands with at least one binder; e) scattering the glued wood strands onto a conveyor belt; and f) pressing the glued wood strands into an OSB wood-based board. The steam treatment takes place after the wood strands have been produced and made available, or after the wood strands have been sifted and separated according to the use of the wood strands for the middle and top layers of the panel. Also, an OSB wood-based panel made using the process.

15 Claims, 3 Drawing Sheets

(51) Int. Cl.

| | |
|---|---|
| ***B27K 1/02*** | (2006.01) |
| ***B27L 1/00*** | (2006.01) |
| ***B27L 11/00*** | (2006.01) |

(52) U.S. Cl.
CPC .......... *B27N 3/143* (2013.01); *B27K 2200/10* (2013.01); *B27K 2240/10* (2013.01)

(58) Field of Classification Search
CPC ... B27K 2200/15; B27K 2240/10; B27L 1/00; B27L 11/007; B27N 1/00; B27N 1/003; B27N 3/02; B27N 3/04; B27N 3/08; B27N 3/086; B27N 3/10; B27N 3/12; B27N 3/14; B27N 3/143; B27N 3/18; D21C 1/02
See application file for complete search history.

(56) References Cited

U.S. PATENT DOCUMENTS

| | | | | |
|---|---|---|---|---|
| 5,433,905 | A | 7/1995 | Tisch | |
| 5,447,686 | A | 9/1995 | Seidner | |
| 5,643,376 | A | 7/1997 | Gerhardt et al. | |
| 5,665,798 | A | 9/1997 | Speaks et al. | |
| 6,098,679 | A | 8/2000 | Go et al. | |
| 7,258,761 | B2 | 8/2007 | Liu et al. | |
| 7,713,382 | B2 | 5/2010 | Lampinen et al. | |
| 10,119,088 | B2 | 11/2018 | Brusletto et al. | |
| 10,730,202 | B2 * | 8/2020 | Kalwa | .................. B27K 5/0085 |
| 11,007,668 | B2 * | 5/2021 | Kalwa | .................... B27K 5/001 |
| 2005/0029373 | A1 | 2/2005 | Vaders | |
| 2009/0077924 | A1 | 3/2009 | Lau et al. | |
| 2009/0145564 | A1 | 6/2009 | Seifert et al. | |
| 2013/0298814 | A1 | 11/2013 | Militz et al. | |

FOREIGN PATENT DOCUMENTS

| | | | | |
|---|---|---|---|---|
| CN | 101774203 | A | 7/2010 | |
| CN | 101817197 | A | 9/2010 | |
| DE | 102010050788 | A1 | 5/2012 | |
| DE | 102012101716 | A1 | 9/2013 | |
| DE | 102013001678 | A1 | 7/2014 | |
| EP | 0695609 | A2 | 2/1996 | |
| EP | 2289980 | A1 | 3/2011 | |
| EP | 1661677 | B1 | 5/2014 | |
| EP | 2765178 | A1 | 8/2014 | |
| EP | 2889112 | A1 | 7/2015 | |
| EP | 1907178 | B1 | 7/2016 | |
| JP | 2001001318 | A | 1/2001 | |
| JP | 2001001318 | A * | 1/2001 | |
| WO | 2013127947 | A1 | 9/2013 | |
| WO | WO-2017084884 | A1 * | 5/2017 | ............... B27D 1/04 |

* cited by examiner

PROCESS FOR THE PRODUCTION OF OSB WOOD-BASED BOARDS WITH REDUCED EMISSION OF VOLATILE ORGANIC COMPOUNDS (VOCS)

CROSS-REFERENCE TO RELATED APPLICATIONS

This application is a continuation of U.S. patent application Ser. No. 16/497,535 filed Sep. 25, 2019, now U.S. Pat. No. 11,007,668, which is the United States national phase of International Application No. PCT/EP2018/056070 filed Mar. 12, 2018, and claims priority to European Patent Application No. 17 167 974.9 filed Apr. 25, 2017, the disclosures of which are hereby incorporated by reference in their entirety.

BACKGROUND OF THE INVENTION

Field of the Invention

This invention concerns a process for treating wood strands with steam, a device for performing the steam treatment, a process for producing OSB wood-based boards, a production line for producing OSB wood-based boards, and the use of steam-treated wood strands.

Description of Related Art

Coarse chipboards, also called OSB (oriented strand boards), are wood-based boards made from long chips (strands). OSB boards are increasingly used in timber and prefabricated house construction, as OSB boards are lightweight and still meet the structural requirements set for building boards. OSB boards are used as building boards and as wall or roof paneling or also in the floor area.

The OSB boards are manufactured in a multi-stage process in which the chips or strands of debarked round wood, preferably coniferous wood, are first peeled lengthwise by rotating knives. In the subsequent drying process, the natural moisture of the strands is reduced at high temperatures. The degree of humidity of the strands can vary depending on the adhesive used, whereby the humidity should be well below 10% in order to avoid splitting during subsequent pressing. Depending on the adhesive, wetting on rather damp strands or on dry strands may be more advantageous. In addition, as little moisture as possible should be present in the strands during the pressing process in order to reduce the steam pressure generated during the pressing process as far as possible, as this could otherwise cause the raw board to burst.

After drying the strands, they are introduced into a gluing device, where the glue or adhesive is applied to the chips in a finely distributed manner. PMDI (polymeric diphenylmethane diisocyanate) or MUPF (melamine-urea-phenol-formaldehyde) glues are mainly used for gluing. The glues can also be used mixed in the OSB boards. These glues are used because, as mentioned above, OSB boards are often used for structural applications. Moisture- or moisture-resistant glues must be used there.

After gluing, the glued strands are scattered in scattering devices alternating lengthwise and crosswise to the production direction, so that the strands are arranged crosswise in at least three layers (lower top layer—middle layer—upper top layer). The direction of scattering the lower and upper top layers is the same, but differs from the direction of scattering the middle layer. The strands used in the top layer and middle layer also differ from each other. For example, the strands used in the top layers are flat and the strands used in the middle layer are less flat and even chip-shaped. Usually two strands of material are used in the production of OSB boards: one with flat strands for the later top layers and one with "chips" for the middle layer. Accordingly, the strands in the middle layer can be of inferior quality, since the bending strength is essentially generated by the top layers. Therefore, fines produced during chipping can also be used in the middle layer of OSB boards. The percentage distribution between middle and top layer is at least 70% to 30%. Following the scattering the strands, a continuous pressing of the strands takes place under high pressure and high temperature, e.g. 200 to 250° C. The strands are then pressed into the ground.

OSB boards are becoming increasingly popular and versatile, not least because of their sustainability, for example as a structural element in house construction or as formwork in concrete construction. However, hygroscopic properties inherent in wood-based materials have a negative effect in some applications.

Particularly when OSB is used indoors, the escape of wood constituents is viewed critically. This is particularly problematic with OSB boards made of pine wood, as these exhibit particularly high emissions of volatile organic compounds.

In the course of the production of wood-based boards and in particular due to the manufacturing process of the wood strand, a large number of volatile organic compounds are released. Volatile organic compounds, also known as VOCs, include volatile organic substances that evaporate easily or are already present as gas at lower temperatures, such as room temperature.

The volatile organic compounds (VOC) are either already present in the wood material and are released from it during processing or, according to current knowledge, they are formed by the degradation of unsaturated fatty acids, which in turn are decomposition products of the wood. Typical conversion products that occur during processing include pentanal and hexanal, but also octanal, 2-octenal or 1-heptenal. In particular, softwoods, from which OSB boards are predominantly made, contain large amounts of resin and fats which lead to the formation of volatile organic terpene compounds and aldehydes. However, VOCs, such as the aldehydes mentioned above, can also be produced or released when certain adhesives are used in the manufacture of wood-based materials.

The emission of constituents in OSB material boards is critical above all because this material is predominantly used uncoated. This allows the ingredients to evaporate unhindered. In addition, OSB boards are frequently used for cladding/planking large areas, which usually results in a high room load ($m^2$ OSB/$m^3$ room air). This additionally leads to a concentration of certain substances in the room air.

Various approaches have been described in the past to solve the problem of VOC emissions.

In the past, attempts were made to at least reduce aldehyde emissions by adding reducing agents. However, many of these reducing agents contained sulphur, which led to undesirable emissions of sulphur dioxide during plate production and later use.

One approach was followed in EP 1 907 178 B1. Here, wood chips or wood fibres are treated with a bisulfite compound, e.g. sodium or ammonium bisulfite, over a period of 3-8 minutes at a pressure of 6-12 bar in a saturated steam atmosphere or in a steam-saturated air before gluing. It is assumed that the addition of bisulphite binds volatile substances in the crushed wood and suppresses the formation of new volatile substances. However, the chemicals used not only make the process more expensive, but also sometimes lead to unpleasant odors in the production process.

The addition of activated carbon has also been tested, but is not satisfactory from a technological and cost point of view.

The addition of suitable VOC scavengers almost always takes place after the drying process of the strands, since this or the temperature impact in the press was considered to be the triggering reason for the majority of the emission. The VOC scavenger were added in liquid form via the glue system, solids were added at various points in the process (e.g. dispersion). This required an additional installation of dosing stations to ensure homogeneous distribution.

SUMMARY OF THE INVENTION

The invention is now based on the technical object of improving the known process for the production of OSB material boards in order to produce OSB material boards easily and safely with a significantly reduced emission of volatile organic compounds (VOCs). At least the emission of terpenes should be reduced. If possible, the manufacturing process should be changed as little as possible and costs should not increase disproportionately. Furthermore, the solution should be as flexible as possible. Finally, environmental aspects should also be taken into account, i.e. the solution should not generate additional energy consumption or waste.

A further technical task was to design a plant which allows an easy treatment of the strands to reduce the emission of VOCs. This should be integrated into the production process and should not disrupt or make the production of OSB more expensive. Also the technical expenditure for the treatment should not lead to an increase of safety measures or contain a larger danger potential.

This task is solved in accordance with the invention by a process for treating wood strands with steam having features as described herein, a device for steam treatment having features as described herein, and a process for producing OSB wood-based boards having features as described herein.

Accordingly, a process is provided for the treatment of wood strands suitable for the production of OSB boards, in particular with the aim of reducing the VOC emission from these wood strands, wherein the wood strands are treated with steam without drying after their recovery from suitable woods, wherein the steam is passed over the wood strands at a temperature between 80° C. and 120° C. and a pressure between 0.5 bar and 2 bar.

In one embodiment of the present process, the wood strands are treated with steam in such a way that the steam is passed over the woods strand at a temperature between 90° C. and 110° C., in particular preferably 100° C., at a pressure between 0.7 bar and 1.5 bar, in particular preferably 1 bar (atmospheric pressure).

Thus the steam treatment takes place at the temperature-dependent pressure at which the steam is introduced into the treatment device. Especially a steam treatment at normal pressure (temperature of the introduced steam of 100° C.) is preferred. Accordingly, the application of an additional (external) pressure (i.e. in addition to the pressure with which water vapour enters the system) can be dispensed with. This leads to a simplification of the device, as no pressure vessels (such as an autoclave or a pressure chamber) are necessary for the steam treatment.

Due to the preferably used saturated steam atmosphere, the steam treatment of the wood strands is carried out in an oxygen-low atmosphere or under exclusion of oxygen as far as possible.

The present steam treatment of the wood strands is carried out in a separate steam treatment device. The steam treatment takes place outside a chipper (e.g. knife ring chipper or disc chipper) and is therefore not part of the chipping or shredding process of wood for the production of wood strands. It is also essential that the steam treatment can be carried out before the drying of the wood strand.

No additives are added to the steam: In particular, no bleaching agents such as bisulphites or oxygen-releasing substances are added. However, the addition of other VOC scavengers to the binder can also be dispensed with.

In one embodiment of the present process, the steam treatment of the wood strands is carried out over a period of 5 to 30 minutes, preferably 10 to 20 minutes, in particular 15 minutes. The amount of steam is a maximum of 1 kg steam/kg strands (atro).

The duration of the steam treatment is primarily determined by the speed of the transport device, on which the wood strands are continuously guided through the steam treatment device.

In a particularly preferred embodiment, the water steam is collected as condensate after passing through the wood strands. The advantage is that the load of the condensate with organic compounds is relatively low. The COD (chemical oxygen demand) was approx. 250 mg COD/I when one kilogram of stand was treated with one kilogram of steam.

The wood strands used here may have a length between 50 and 200 mm, preferably 70 to 180 mm, preferably 90 to 150 mm; a width between 5 and 50 mm, preferably 10 to 30 mm, preferably 15 to 20 mm; and a thickness between 0.1 and 2 mm, preferably 0.3 and 1.5 mm, preferably 0.4 and 1 mm.

In one embodiment, the wood strands have a length between 150 and 200 mm, a width between 15 and 20 mm, a thickness between 0.5 and 1 mm and a moisture content of max. 50%.

The steam treatment of the wood strands is carried out in a device comprising the following elements or characteristics:

- at least one housing, in particular a tubular housing;
- at least one transport device passing through the housing for transporting the wood strands through the housing; and
- at least one supply line for the steam provided above the transport device in the housing, wherein at least one spraying means for applying the steam to the wood strands located on the transport device is arranged along the supply line.

One variant may have at least one housing in the form of a metal tube or tube body.

In one embodiment of the present device, at least one transport device consists of at least one conveyor belt. The conveyor belt should have perforations or other openings so that the steam can be led from the top of the conveyor belt past the wood strands to the underside of the conveyor belt. The wood strands are distributed on the conveyor belt in such a way that a homogeneous flow of steam through the wood strands is possible.

In a further embodiment of the present device, more than one spraying means is provided at the steam supply line. The number of spraying means depends in particular on the total length of the housing. The spraying means can also be controlled individually, so that the required amount of steam can be specifically adjusted. Nozzles or other suitable injectors can be used as spraying means, which enable uniform spraying and even distribution of the steam on and between the wood strands.

As already mentioned above, in a particularly preferred embodiment the steam is collected as condensate after passing through the wood strands. For this purpose, at least one means for collecting the condensate is provided in the evaporation plant below the conveyor belt (in relation to the direction of flow of the steam). For example, the tube body can be angled upwards in the feed direction.

The condensate collected in this way contains wood constituents washed out of the wood strands, in particular aldehydes, organic acids and/or terpenes, in particular those with a certain water solubility.

After leaving the steam treatment device, the steam-treated strands have a temperature of 80 to 90° C. At this temperature, the wood strands from the steam treatment station enter a dryer (as part of the OSB board production line), resulting in an increase in dryer performance. This means that the energy needed to remove wood components is then used for the drying process. In a normal process the inlet temperature of the strands into the dryer is about 25° C.

The steam-treated wood strands are used according to the invention for the production of OSB wood-based boards with reduced emission of volatile organic compounds (VOCs).

The production of OSB wood-based boards with reduced emission of volatile organic compounds (VOCs) is carried out in a process comprising the following steps:

a) Producing of wood strands from suitable wood logs;
b) Treating at least part of the wood strands with steam in accordance with the process described above;
c) Drying the steam-treated wood strands;
d) Gluing the steam-treated and dried wood strands; and optional gluing non-steam-treated wood strands with at least one binder;
e) Scattering the glued wood strands on a conveyor belt; and
f) Pressing of the glued wood strands into an OSB wood-based board.

This process enables the production of OSB wood-based boards using steam-treated wood strands, which are introduced into a known production process in addition to or as an alternative to untreated wood strands. An OSB wood-based board produced by the method according to the invention comprising steam-treated wood strands exhibits a reduced emission of volatile organic compounds, in particular terpenes and aldehydes.

There are several advantages to the provision of the present procedure. This enables simple production of OSB wood-based boards without significantly influencing the usual process chain and with significantly reduced emission of volatile organic compounds from the OSB. In addition, the energy requirement for drying the wood strands can be reduced, since the wood strands already have an elevated temperature (e.g. approx. 90° C.) when they enter the dryer; i.e. the energy input during the steam treatment supports the drying process. It is also possible to dispense with the use of additional chemicals, which makes the overall process ecologically and economically advantageous.

Compared to conventional OSB production processes, the production of OSB in this process is modified in such a way that at least some of the strands used are treated with steam after production before drying. The strands may be those intended for the top or middle layers. After the treatment, the strands are fed to the standard drying process. This takes place, for example, immediately before gluing, whereby a complete substitution or only a partial substitution of the standard strands can take place.

In another embodiment of the present process, steam-treated wood strands or a mixture of steam-treated wood strands and non-steam-treated wood strands are used as the middle layer and/or top layer of the OSB wood-based board.

Thus, in one variant a complete substitution of the wood strands is possible, whereby the steam-treated wood strands are used in the middle layer, and in one or both top layers or also in all layers.

In another variant it is possible to form only the middle layer of steam-treated wood strands and to use non-steam-treated wood strands for one or both top layers. Since steam-treated wood strands have a lighter color, it can be advantageous to use steam-treated wood strands in the top layer. These give the OSB a more attractive color.

In a further variant, only one or both top layers are formed from steam-treated wood strands, and dried and non-steam-treated wood strands are used for the middle layer if necessary.

In a further variant it is conceivable and possible to use a mixture with any ratio of steam treated wood strands and non-steam treated wood strands for the middle and top layers. In such a case, the mixture may comprise between 10 and 50% by weight, preferably between 20 and 30% by weight, of untreated or non-steam-treated wood strands and between 50 and 90% by weight, preferably between 70 and 80% by weight, of steam-treated wood strands.

In a further embodiment variant, the steam treatment step of the wood strands can be carried out separately from the manufacturing process of the OSB wood-based boards. Accordingly, the steam treatment in this embodiment of the present process is carried out outside the overall process or the process line. The wood strands are discharged from the manufacturing process and introduced into the steam treatment device (e.g. evaporation plant). The steam-treated wood strands can then be reintroduced into the conventional manufacturing process after intermediate storage, e.g. immediately before gluing. This enables a high degree of flexibility in the manufacturing process.

The steam treatment of the wood strands can be integrated into the production process of the OSB wood-based boards in a further embodiment, i.e. the steam treatment step is integrated into the overall process or process line and takes place online.

In this case, the steam treatment may be carried out (i) immediately after chipping and providing the wood strands or (ii) only after classifying and separating the wood strands according to the use of the wood strands for middle or top layer. In the latter case, a separate steam treatment of the wood strands may be carried out according to the requirements of the wood strands used in the middle and top layers.

In a further variant of the present process, the steam treatment of the wood strands is carried out in at least one steam treatment device, preferably in two steam treatment devices. The steam treatment device used in this case can be a batch device or a continuously operated device, whereby a continuously operated device is preferred.

As noted above, the steam treatment of strands used for the middle and top layers of the OSB wood-based board can be carried out separately in at least two steam treatment plants. This makes it possible to adapt the degree of steam deposition of the steam treated wood strands used in the middle and/or top layer to the respective requirements and customer wishes. In this case, the two evaporation systems used are preferably connected or arranged in parallel.

The wood strands are brought into contact with the at least one binder in step d) preferably by spraying or atomizing the binder onto the wood strand. Many OSB plants work with rotating coils (drums with atomizer gluing). Mixer gluing would also be possible. In a mixer the strands are intimately mixed with the glue by rotating blades.

A polymer adhesive selected from the group consisting of formaldehyde adhesives such as urea-formaldehyde resin adhesive (UF), melamine-urea-phenol-formaldehyde adhesive (MUPF) and/or melamine-formaldehyde resin adhesive (MF), polyurethane adhesives, epoxy resin adhesives, polyester adhesives is preferably used as a binder in one of the forms of the present process. The use of a polyurethane adhesive is preferred, the polyurethane adhesive being based on aromatic polyisocyanates, in particular polydiphenylmethane diisocyanate (PMDI), tolylene diisocyanate (TDI) and/or diphenylmethane diisocyanate (MDI), PMDI being particularly preferred.

In a variant of the present process, the steam-treated and non-steam-treated wood strands are glued with a binder quantity of 1.0 to 10 wt %, in particular 1.0 to 5.0 wt %, preferably 2 to 4 wt %, in particular 3 wt %, in particular (based on the total quantity of wood strands). It is conceivable that the same binding agents or different binding agents are used for the top and middle layers.

In one variant, the top layers can each be provided with 2.6 wt % PMDI on atro wood and the middle layer with 2.9 wt % PMDI on atro wood.

In another alternative variant, the top layers can each be provided with 10 wt % MUPF on atro wood and the middle layer with 2.9 wt % PMDI on atro wood.

In another alternative variant, the top layers can each be provided with 10 wt % MUF on atro wood and the middle layer with 2.9 wt % PMDI on atro wood.

The alternatives listed concern the gluing of the top layers and the middle layer of a 3-layer OSB with a thickness of 19 to 22 mm.

It is also possible to add at least one flame retardant to the wood strands together or separately with the binder. The flame retardant can typically be added in an amount between 1 and 20 wt %, preferably between 5 and 15 wt %, in particular preferably 0 wt % based on the total amount of wood strand. Typical flame retardants are selected from the group comprising phosphates, sulfates borates, in particular ammonium polyphosphate, tris(tri-bromneopentyl)phosphate, zinc borate or boric acid complexes of polyhydric alcohols.

The glued (steam-treated and/or non-steam-treated) wood strands are scattered on a conveyor belt, forming a first top layer along the transport direction, then a middle layer across the transport direction and finally a second top layer along the transport direction.

After scattering, the glued wood strands are pressed at temperatures between 200 and 250° C., preferably 220 and 230° C., to form an OSB wood-based board.

In a first preferred embodiment, the present process for the production of an OSB wood-based board with reduced VOC emission comprises the following steps:

Producing of wood strands from suitable wood logs, in particular by means of chipping of suitable woods, Treating the wood strands with steam at a temperature between 80° C. and 120° C. at a pressure between 0.5 bar and 2 bar, in oxygen free or oxygen-low atmosphere;

Drying the steam-treated wood strands;

Classifying and separating the steam-treated wood strands into wood strands suitable for use as middle layer and top layer;

Gluing the separated wood strands;

Scattering the glued, steam-treated wood strands onto a conveyor belt in the order of first lower top layer, middle layer and second upper top layer; and Pressing the glued wood strands into an OSB wood-based board.

In a second preferred embodiment, the present process for the production of an OSB wood-based board with reduced VOC emission comprises the following steps:

Producing of wood strands from suitable wood logs, in particular by means of chipping of suitable woods;

Classifying and separating the wood strands into wood strands suitable for use as middle layer and top layer;

Treating the wood strands intended for the middle layer and/or the wood strands intended for the top layer(s) with steam at a temperature between 80° C. and 120° C. at a pressure between 0.5 bar and 2 bar, in an oxygen-free or oxygen-low atmosphere;

Drying the steam-treated wood strands;

Gluing the separated steam-treated wood strands and gluing the non-steam-treated wood strands;

Scattering the glued, steam-treated and non-steam treated wood strands on a conveyor belt in the following order first lower top layer, middle layer and second upper top layer; and Pressing the glued wood strands into an OSB wood-based board.

Accordingly, the present process enables the production of an OSB wood-based board with reduced emission of volatile organic compounds (VOCs), which comprises steam-treated wood strands.

This OSB wood-based board may consist entirely of steam-treated wood strands or of a mixture of steam-treated and non-steam-treated wood strands. In one embodiment, both top layers and the middle layer of the OSB consist of steam-treated wood strands, in another embodiment, the two top layers consist of non-steam-treated wood strands and the middle layer consists of steam-treated wood strands, and in another embodiment, the two top layers consist of steam-treated wood strands and the middle layer consists of non-steam-treated wood strands.

This OSB wood-based board can have a bulk density between 300 and 1000 kg/m$^3$, preferably between 500 and 800 kg/m$^3$, in particular preferably between 500 and 600 kg/m$^3$.

The thickness of the OSB wood-based board can be between 5 and 50 mm, preferably between 10 and 40 mm, whereby a thickness between 15 and 25 mm is preferred.

The OSB wood-based board produced by the present process exhibits in particular a reduced emission of aldehydes released during wood pulping, in particular pentanal or hexanal, and/or terpenes, in particular caren and pinene.

The release of aldehydes occurs during the chipping process and the associated aqueous processing and cleaning of the wood strand. Specific aldehydes can be formed from the basic building blocks of cellulose or hemicellulose. For example, aldehyde furfural is formed from mono- and disaccharides of cellulose or hemicellulose, while aromatic aldehydes can be released from lignin. The aliphatic aldehydes (saturated and unsaturated) are formed by the fragmentation of fatty acids with the participation of oxygen.

Due to the use of steam-treated wood strands, the emission of $C_2$-$C_{10}$ aldehydes, in particular preferably acetaldehyde, pentanal, hexanal or furfural, is reduced, as is the emission of terpenes, in particular $C_{10}$ monoterpenes and $C_{15}$ sesquiterpenes, in particular acyclic or cyclic monoterpenes in the OSB wood-based boards.

Typical acyclic terpenes are terpene hydrocarbons such as myrcene, terpene alcohols such as gerianol, linaool, ipsinol and terpene aldehydes such as citral. Typical representatives of the monocyclic terpenes are p-menthane, terpeninol, limonene or carvone, and typical representatives of the bicyclic terpenes are caran, pinan, bornan, whereby in particular 3-carene and α-pinene are important. Terpenes are components of tree resins and are therefore particularly present in resinous tree species such as pine or spruce.

The emission of organic acids, in particular the emission of acetic acid from OSB wood-based boards, can also be reduced. Organic acids arise in particular as fission products of the wood components cellulose, hemicellulose and lignin, whereby alkanoic acids such as acetic acid and propionic acid or aromatic acids are preferably formed.

In particular, the strong reduction of aldehydes was in no way predictable for the expert. It can thus be assumed that during the steam treatment, water is attached to the double bonds of the unsaturated fatty acids and thus aldehyde formation is avoided. However, due to the low electrophilicity of water, such additions usually take place only in the presence of mineral acids (sulphuric acid, phosphoric acid, etc.) at higher temperatures.

The present process is carried out in a production line for the manufacture of an OSB board and comprises the present elements:

- at least one device for debarking suitable logs;
- at least one chipper for chipping the debarked logs in wood strands;
- at least one device described above for the steam treatment of at least part of the wood strands;
- at least one dryer for drying the steam-treated wood strands;
- at least one device for classifying and separating the wood strands (steam treated and non-steam treated);
- at least one device for gluing the wood strands;
- at least one device for scattering the glued wood strands on a conveyor belt, and
- at least one press for pressing the scattered wood strands into OSB boards.

As already mentioned above, the steam treatment device can be designed continuously. For this purpose, the wood strands are applied to a conveyor belt, which guides the wood strands through the steam treatment device at a specified speed. While passing through the steam treatment device, the wood strands are evenly sprayed with steam, which is introduced from nozzles provided above the conveyor belt.

The steam treatment device may be located upstream of the device for separating and classifying the wood strands. In this case, all wood strands are subjected to a steam treatment.

It is also possible, however, that two steam treatment devices are provided behind (downstream) the device for classifying and separating the wood strands. In this case, one steam treatment device is used for the steam treatment of the wood strands intended for the middle layer and the other for the steam treatment of the wood strands intended for the top layers. This enables a steam treatment of the wood strands for the middle layer or the wood strands for the top layers.

BRIEF DESCRIPTION OF THE DRAWINGS

The invention is explained in more detail below with reference to the figure in the drawing provided as an example.

DESCRIPTION OF THE INVENTION

Figure 1:
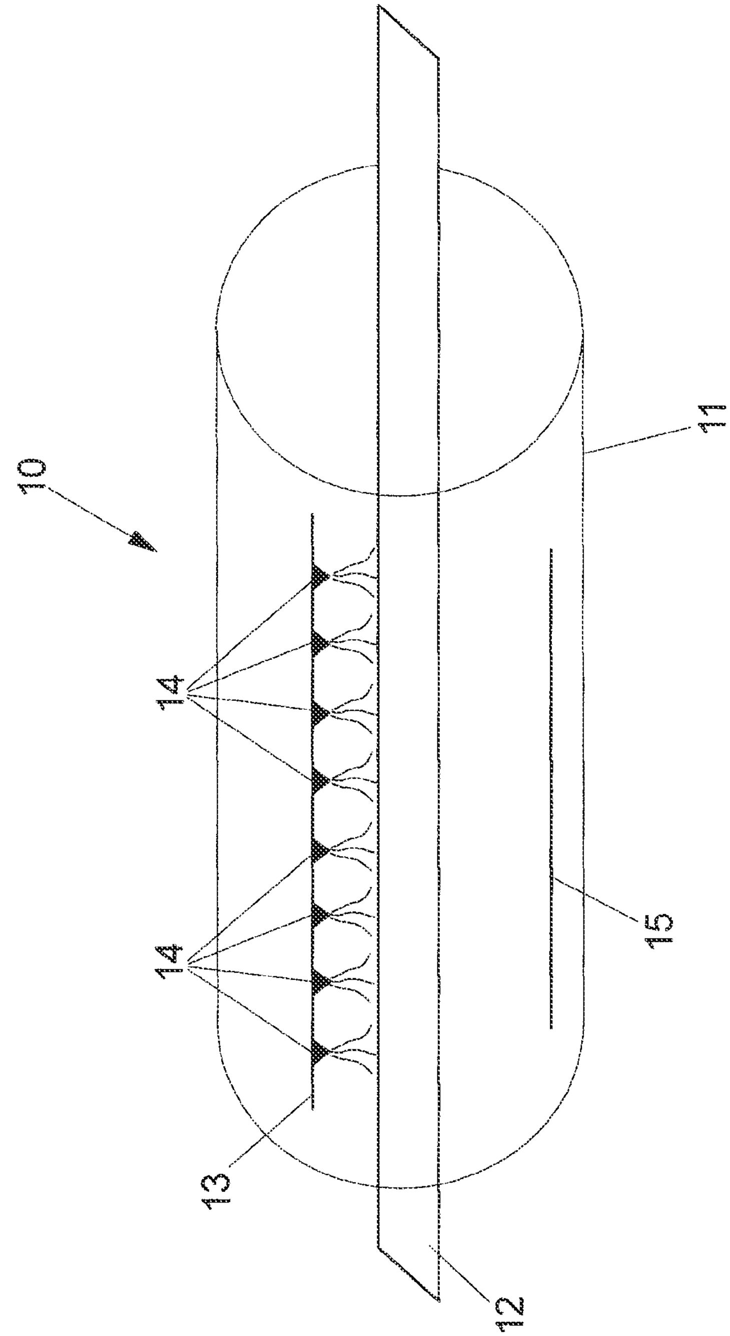
FIG. 1 shows a schematic representation of an embodiment of a device for the steam treatment of wood strands.

FIG. 1 shows a variant of a device 10 for steam treatment of wood strands. The device comprises a (thermally insulated) tubular body 11 with a perforated conveyor belt 12 running through the tubular body 11. Above the conveyor belt 12 a supply line 13 for the steam is provided, the supply line 13 having a plurality of nozzles 14 for spraying the steam onto the wood strands located on the conveyor belt 12. Below conveyor belt 12, a collecting medium 15 is provided for the steam condensate that forms.

The present device 10 enables a steam treatment of the strands even before the drying of the strands in the drum dryer. All or parts of the strands, which are intended for the later production of the OSB, can be treated. The treatment takes place at normal pressure and achieves the homogeneous treatment of the strands with steam by using the conveyor belt 12 made of metal mesh.

The conveyor belt is dimensioned so that the strands cannot fall through the gaps. The strands are transferred directly after production to the conveyor belt 12, which runs through the tube body 11. The strands are distributed on conveyor belt 12 in such a way that steam can flow homogeneously through the strands. Separation stations positioned at regular intervals ensure the dissolution of existing or emerging strand piles.

Since the conveyor belt 12 is cooled by condensate formed when the strands are heated and has a relatively high mass compared to the strands, the belt must be heated before the strands are scattered. This accelerates the heating of the strands and thus reduces the treatment time with steam. The heating can take place by resistance heating or by radiation.

Steam is then applied to the strands from above through nozzles 14. The steam has a temperature of approx. 100° C. The insulation of the metal tube 11 ensures that the heat losses are as low as possible. The condensate formed is collected under the transport device 12, freed of suspended particles and returned to the system after a cleaning step to remove dissolved substances.

The residence time of the strands in the saturated steam atmosphere is 5 to 15 minutes. At regular intervals the progress of the strand heating is determined by thermal sensors. The temperature of the strands should be close to 90° C. at the end of the treatment.

Figure 2:
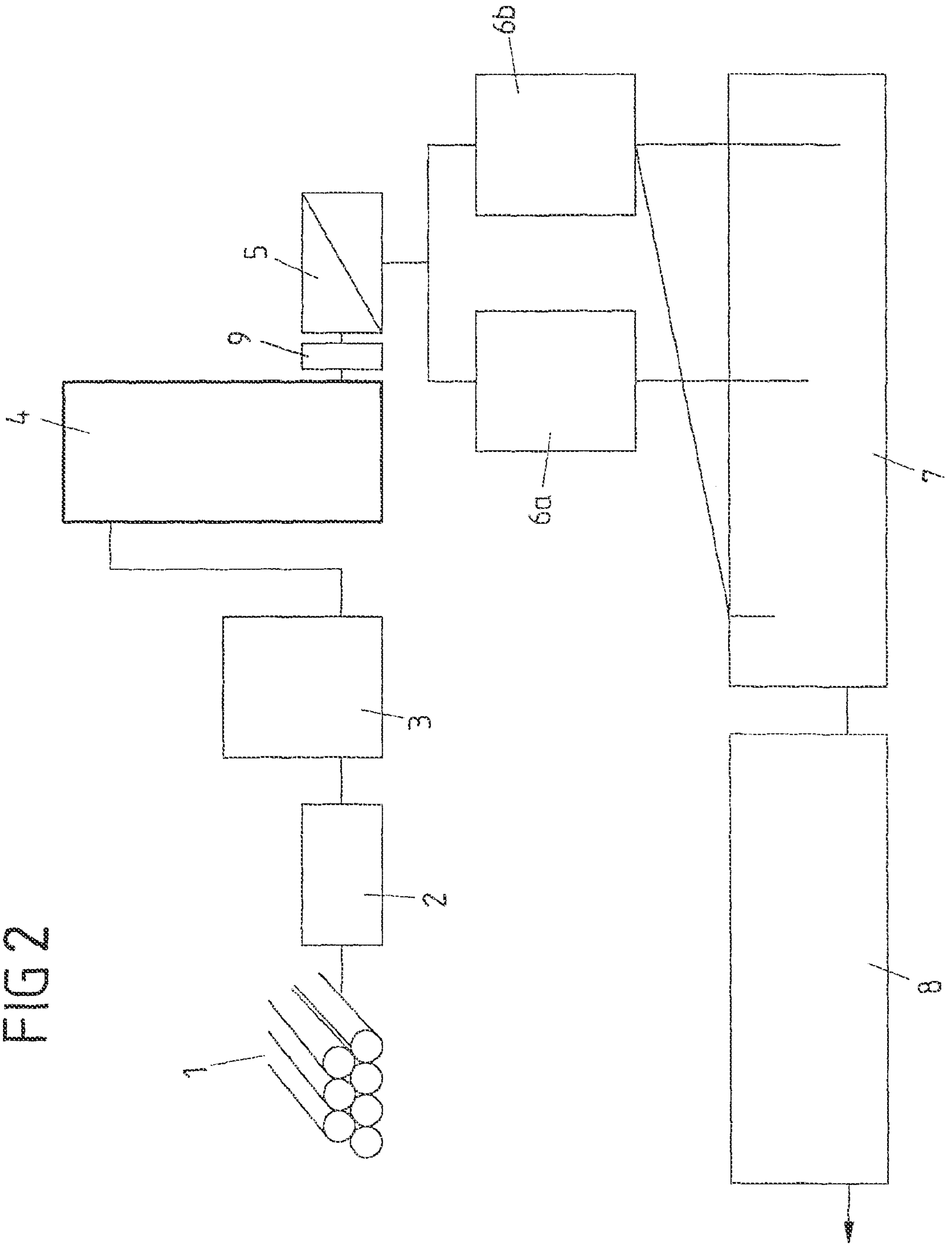
FIG. 2 shows a schematic representation of a first implementation form of the inventive process for the production of OSB boards.

The first embodiment of the process according to the invention shown in FIG. 2 describes the individual process steps starting with the provision of the wood starting product up to the finished OSB wood-based board.

Accordingly, suitable wood starting material for the production of the wood strands is first provided in step 1. All softwoods, hardwoods or mixtures of these are suitable as wood starting materials.

The debarking (step 2) and chipping (step 3) of the wood starting material takes place in suitable chippers, whereby the size of the wood strands can be controlled accordingly. After shredding and provision of the wood strands, they may be subjected to a pre-drying process, where a moisture content of 5-10% with respect to the initial moisture content of the wood strands is set (not shown).

In the case of the embodiment shown in FIG. 2, the wood strands are introduced into a steam treatment device (step 4). The steam treatment of the wood strands takes place in a temperature range between 80° and 120° C. at a pressure between 0.5 bar and 2 bar. The resulting condensate can be collected and the substances washed out of the wood strands (terpenes, aldehydes) can be used for further applications.

After completion of the steam treatment, which in this case takes approx. 10-20 minutes, the steam-treated wood strands are dried (step 9), classified and separated (step 5).

Separation takes place in wood strands for use as a middle layer (step 6*a*) or as a top layer (step 6*b*) with respective gluing.

The glued, steam-treated wood strands are scattered on a conveyor belt in the sequence first lower top layer, middle layer and second upper top layer (step 7) and then pressed into an OSB wood-based board (step 8).

Figure 3:
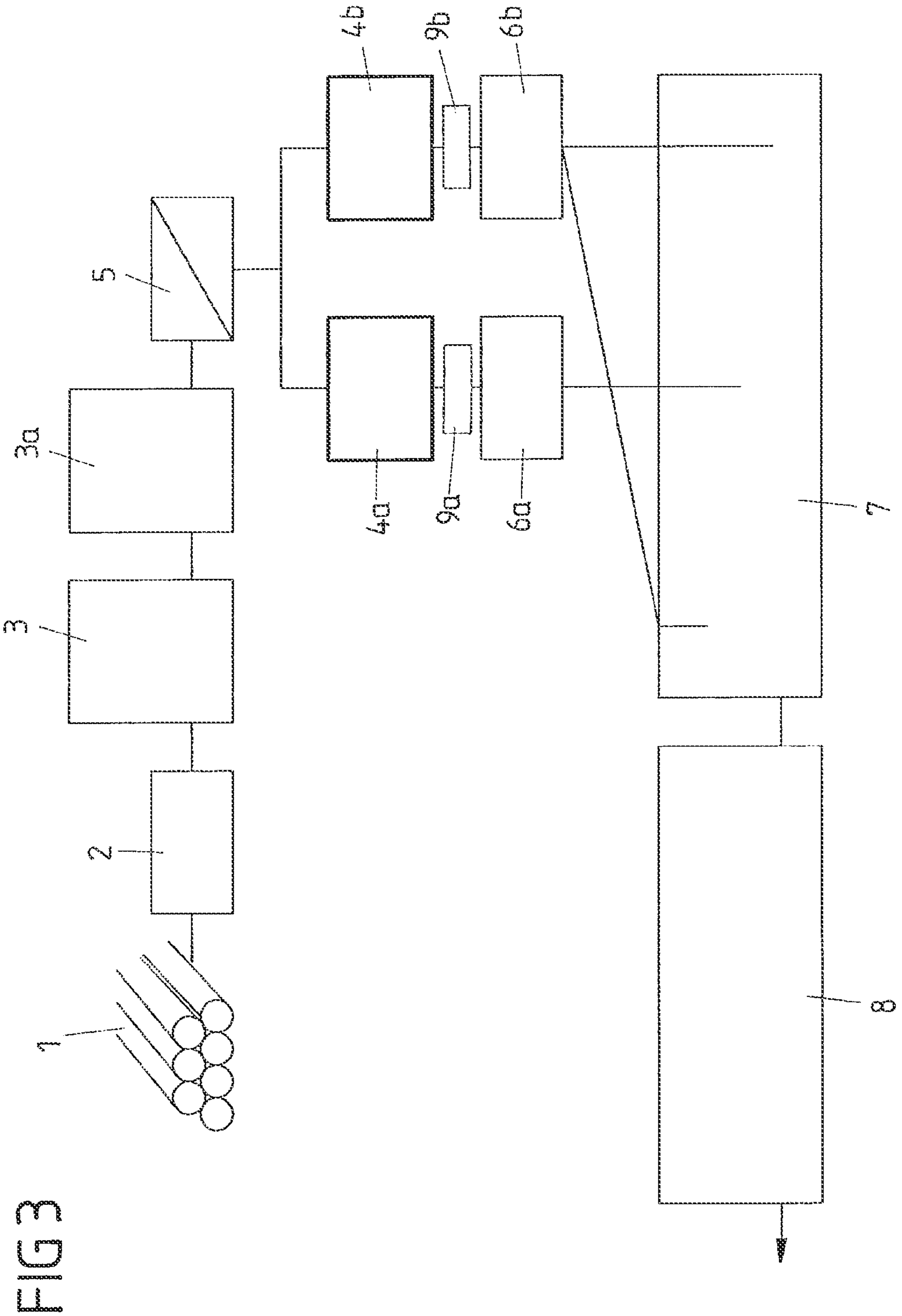
FIG. 3 shows a schematic representation of a second form of implementation of the procedure according to the invention.

In the second embodiment shown in FIG. 3, the wood starting material is first provided (step 1), debarked (step 2) and chipped (step 3) in analogy to FIG. 1. If necessary, the wood strands are subjected to a pre-drying process, whereby a moisture content of 5-10% is set in relation to the initial moisture content of the wood strands (step 3*a*).

In contrast to the embodiment variant of FIG. 2, the optional drying is followed by separation in wood strands for use as a middle layer or as a top layer (step 5).

This is followed by steam treatment of the wood strands intended for the middle layer (step 4*a*) and/or steam treatment of the wood strands intended for the top layer(s) (step 4*b*) in a suitable steam treatment device. The steam treatment of the wood strands is carried out in a temperature range between 80° and 120° C. at a pressure between 0.5 bar and 2 bar. The resulting condensate can be collected and the substances washed out of the wood strands (terpenes, aldehydes) can be used for further applications.

It is also possible that only the wood strands for the middle layer are subject to steam treatment, while the wood strands for the top layers remain untreated.

After completion of the steam treatment, which in this case takes approx. 10-20 minutes, the steam-treated wood strands are dried (steps 9*a*, 9*b*) and glued (steps 6 *a, b*).

The glued, water-treated wood strands are scattered on a conveyor belt in the sequence first lower top layer, middle layer and second upper top layer (step 7) and then pressed into an OSB wood-based board (step 8).

In the finishing process, the OSB wood-based board obtained is assembled in a suitable manner.

Embodiment Example 1

Strands are produced from pine trunks (length: max. 200 mm, width: 20 mm, thickness: max. 1 mm, humidity max. 50%) and treated in a continuous process with steam at a temperature of about 100° C. The strands are then heated to a temperature of about 100° C. During the treatment, the strands are loosely piled up on a conveyor belt which has perforations and thus permits the passage of steam after passing through the strands. The steam treatment was preferably carried out from top to bottom. The conveyor belt is guided through a tubular body. Preferably, nozzles are installed above the conveyor belt with the loosely poured strands, which distribute the steam evenly over the strands. The treatment with steam takes about 15 minutes. The steam treatment is carried out with the exclusion of oxygen as far as possible, so that one can speak of reductive process control.

The tube body has a diameter of 50 cm and a length of 3 m to achieve a residence time of about 15 minutes. The conveyor belt was moved through the tube body at a speed of about 2 m/10 minutes. In the feed direction, the tube body was slightly angled upwards (2 to 10 degrees), so that the condensate formed could easily be trapped. This is a test plant with which the effect should be proven. For a production line, it can be enlarged and easily optimized by a specialist in terms of transport speed and quantity.

The strands are then dried in a conventional drum dryer. The energy requirement of the drum dryer is significantly reduced, as the strands already have a temperature of around 90° C. when they enter the dryer. Then they are glued in a coil with adhesive, preferably with PMDI (approx. 3 wt % on atro wood).

The glued stands are scattered as top and middle layers in a standard OSB plant. The percentage distribution between the middle and top layers is preferably 70% to 30%. The strands are pressed into boards with a bulk density of about 570 kg/m$^3$. After a storage period of one week, the test plate together with a standard plate of the same thickness was tested for VOC release in a microchamber.

Chamber parameters: Temperature: 23° C.; Humidity: 0%; Air flow rate: 150 ml/min; Air change: 188/h; Loading: 48.8 m$^2$/m$^3$; Sample surface: 0.003 m$^2$; Chamber volume: 48 ml. The values of the most important parameters in terms of quantity are shown in Table 1.

TABLE 1

| parameter | Experimental plate [μg/m$^2$ × h] | Standard plate [μg/m$^2$ × h] |
|---|---|---|
| hexanal | 194 | 1474 |
| 3-carene | 208 | 626 |
| α-pinene | 181 | 925 |
| Pentanal | — | 155 |
| β-pinene | — | 285 |
| 2-octenal | 60 | 115 |

As can be seen from the results, the emissions of the quantitatively most important parameters are significantly reduced. Some parameters could no longer be detected. Surprisingly, this also applies to the saturated and unsaturated aldehydes, which, according to the assumed correct and plausible path of formation, should only form in the press at high temperatures. This means that either the previously assumed mechanism for the formation of aldehydes is incorrect or that the aldehyde precursors are chemically converted during steam treatment in such a way that the formation of aldehydes is only possible to a limited extent. Originally it was expected that steam treatment would only reduce terpene emissions. These would be expelled in the process as in steam distillation.

Embodiment Example 2

Corresponds to example 1, but in contrast only strands for the middle layer (about 70% of OSB) were treated with steam, with the following result of the VOC test:

Chamber parameters: Temperature: 23° C.; Humidity: 0%; Air flow rate: 150 ml/min; Air change: 188/h; Loading: 48.8 m2/m3; Sample surface: 0.003$^{m2}$; Chamber volume: 48 ml. The values of the most important parameters in terms of quantity are shown in Table 2.

TABLE 2

| Parameter | Experimental plate [μg/m$^2$ × h] | Standard plate [μg/m$^2$ × h] |
|---|---|---|
| hexanal | 243 | 1474 |
| 3-carene | 299 | 626 |
| α-pinene | 178 | 925 |
| pentanal | — | 155 |
| β-pinene | — | 285 |
| 2-octenal | 61 | 115 |

Here, too, a significant reduction in emissions can be observed, although the top layer consists of standard strands.

The invention claimed is:

1. A process for the production of an OSB wood-based panel, with reduced emission of volatile organic compounds (VOCs) in a production line, comprising:

a) producing wood strands from suitable wood;

b) treating at least part of the wood strands with steam, wherein the steam is passed over the wood strands at a temperature between 80° C. and 120° C. and a pressure between 0.5 bar and 2 bar, where the wood strands have been chipped and made available, or the wood strands have been sifted and separated for use as wood strands for middle and top layers of the panel before steam treatment;

c) drying of the wood strands treated with the steam;

d) gluing of the steam treated and dried wood strands and optionally gluing of non-steam treated wood strands with at least one binder;

e) spreading the glued wood strands onto a conveyor belt; and f) pressing of the glued wood strands into an OSB wood-based panel.

2. The process according to claim 1, wherein the steam treatment takes place outside a production line in which the spreading and pressing take place.

3. The process according to claim 2, wherein the wood strands are steam treated in a process that is separate from a process in which the drying, gluing, spreading, and pressing are conducted.

4. The process according to claim 2, wherein the steam treated and dried wood strands are stored before introduction into the production line.

5. The process according to claim 1, wherein the steam treatment of the wood strands is integrated into a production line in which the spreading and pressing take place.

6. The process according to claim 1, wherein the steam treatment is carried out in at least one steam treatment unit.

7. The process according to claim 6, wherein the steam treatment unit is operated as a batch system or continuously.

8. The process according to claim 1, wherein the steam treatment of the wood strands is carried out over a period of 5 to 30 min.

9. The process according to claim 1, wherein the steam treated and optional non-steam treated wood strands are glued with a polymer adhesive as a binder selected from the group consisting of formaldehyde adhesives, polyurethane adhesives, epoxy resin adhesives, and polyester adhesives.

10. The process according to claim 1, wherein a polyurethane adhesive based on aromatic polyisocyanates is used as a binder.

11. The process according to claim 10, wherein the steam-treated and optional non-steam treated wood strands are glued with a binder amount of 1.0 to 10 wt % based on a total amount of wood strands.

12. The process according to claim 1, wherein identical binders or different binders are used for top and middle layers of the panel.

13. The process according to claim 1, wherein the glued steam-treated and/or non-steam treated wood strands are spread onto the conveyor belt to form a first cover layer along a transport direction, then to form a middle layer transverse to the transport direction, and finally to form a second cover layer along the transport direction.

14. The process according to claim 1, wherein steam treatment of the wood strands is conducted in an oxygen-free or low-oxygen atmosphere;

the steam-treated wood strands are separated into wood strands suitable for use as a middle layer and a top layer; and the glued steam treated wood strands are spread on the conveyor belt in an order of a first lower cover layer, a middle layer, and a second upper cover layer prior to pressing of the glued wood strands into the OSB wood-based panel.

15. The process according to claim 1, wherein the wood strands are sifted and separated into wood strands suitable for use as a middle layer and a top layer prior to steam treatment;

treatment of the wood strands is conducted in an oxygen-free or oxygen-poor atmosphere; and the glued steam treated and optional non-steam treated wood strands are scattered onto the conveyor belt in an order of a first lower cover layer, a middle layer, and a second upper cover layer prior to pressing of the glued wood strands into the OSB wood-based panel.

* * * * *